United States Patent
Seto et al.

(10) Patent No.: US 8,230,143 B2
(45) Date of Patent: Jul. 24, 2012

(54) MEMORY INTERFACE ARCHITECTURE FOR MAXIMIZING ACCESS TIMING MARGIN

(75) Inventors: Hui-Yin Seto, San Jose, CA (US); Cheng-Gang Kong, Saratoga, CA (US)

(73) Assignee: LSI Corporation, Milpitas, CA (US)

( * ) Notice: Subject to any disclaimer, the term of this patent is extended or adjusted under 35 U.S.C. 154(b) by 1861 days.

(21) Appl. No.: 11/097,903

(22) Filed: Apr. 1, 2005

(65) Prior Publication Data
US 2006/0224847 A1    Oct. 5, 2006

(51) Int. Cl.
*G06F 13/10* (2006.01)
(52) U.S. Cl. .......................... 710/58; 710/110
(58) Field of Classification Search .................. 711/167; 365/233; 327/155; 710/305
See application file for complete search history.

(56) References Cited

U.S. PATENT DOCUMENTS

| | | | | |
|---|---|---|---|---|
| 6,005,412 A * | 12/1999 | Ranjan et al. | ................ | 326/63 |
| 6,874,581 B1 * | 4/2005 | Porter et al. | ................ | 172/42 |
| 6,975,557 B2 * | 12/2005 | D'Luna et al. | ................ | 365/233 |
| 2003/0196032 A1 * | 10/2003 | Dong | ................ | 711/105 |
| 2003/0217303 A1 * | 11/2003 | Chua-Eoan et al. | ................ | 713/600 |
| 2005/0242850 A1 * | 11/2005 | Kawasaki | ................ | 327/155 |
| 2005/0259505 A1 * | 11/2005 | Grand et al. | ................ | 365/233 |

OTHER PUBLICATIONS

JEDEC, Double Data Rate SDRAM Specification, JEDEC, Mar. 2003, pp. 1-82.*
Xilinx, Synthesizable DDR SDRAM Controller, 2002, Xilinx, pp. 1-16.*
Gavrichenkov, DDR2 vs. DDR: Revenge Gained, 2004, http://www.xbitlabs.com/articles/memory/print/ddr2-ddr.html, pp. 1-28.*

* cited by examiner

*Primary Examiner* — Cheng-Yuan Tseng
(74) *Attorney, Agent, or Firm* — Christopher P. Maiorana, PC

(57) ABSTRACT

An apparatus comprising a control circuit, a buffer circuit and a memory. The control circuit may be configured to present a plurality of pairs of signals in response to (i) one or more input signals operating at a first data rate and (ii) an input clock signal operating at a second data rate. The second signal in each of the pairs comprises a clock signal operating at the second data rate. The buffer circuit may be configured to generate a buffered signal in response to each of the pairs of signals. Each of the buffered signals operates at the second data rate. The memory may be configured to read and write data at the second data rate in response to the buffered signals.

20 Claims, 5 Drawing Sheets

MEMORY INTERFACE ARCHITECTURE FOR MAXIMIZING ACCESS TIMING MARGIN

FIELD OF THE INVENTION

The present invention relates to memories generally and, more particularly, to a method and/or apparatus for implementing a memory interface architecture for maximizing access timing margin.

BACKGROUND OF THE INVENTION

In conventional memory applications, a number of memory address/control signals and a memory clock signal are generated from a memory controller. Such an implementation is particularly true for a double data rate (DDR) memory. The control and clock signals have certain skew parameters according to the particular memory specification. One conventional approach to controlling skew timing is to use a single speed (i.e., 1×) clock signal to generate the memory address/control signals and to use a double speed (i.e., 2×) clock signal to generate a clock signal for the memory. Since such an approach involves two different clock domains, a system for balancing the clock skew between the two clock domains is needed. Such balancing increases the complexity and/or reduces reliability of such a design.

It would be desirable to implement a memory interface that maximizes an access timing margin by using a single external clock signal.

SUMMARY OF THE INVENTION

The present invention concerns an apparatus comprising a control circuit, a buffer circuit and a memory. The control circuit may be configured to present a plurality of pairs of signals in response to (i) one or more input signals operating at a first data rate and (ii) an input clock signal operating at a second data rate. The second signal in each of the pairs comprises a clock signal operating at the second data rate. The buffer circuit may be configured to generate a buffered signal in response to each of the pairs of signals. Each of the buffered signals operates at the second data rate. The memory may be configured to read and write data at the second data rate in response to the buffered signals.

The objects, features and advantages of the present invention include providing a memory architecture that may (i) use a single clock domain for memory operation; (ii) increase the reliability of a memory design; and/or (iii) reduce the complexity of the memory design.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
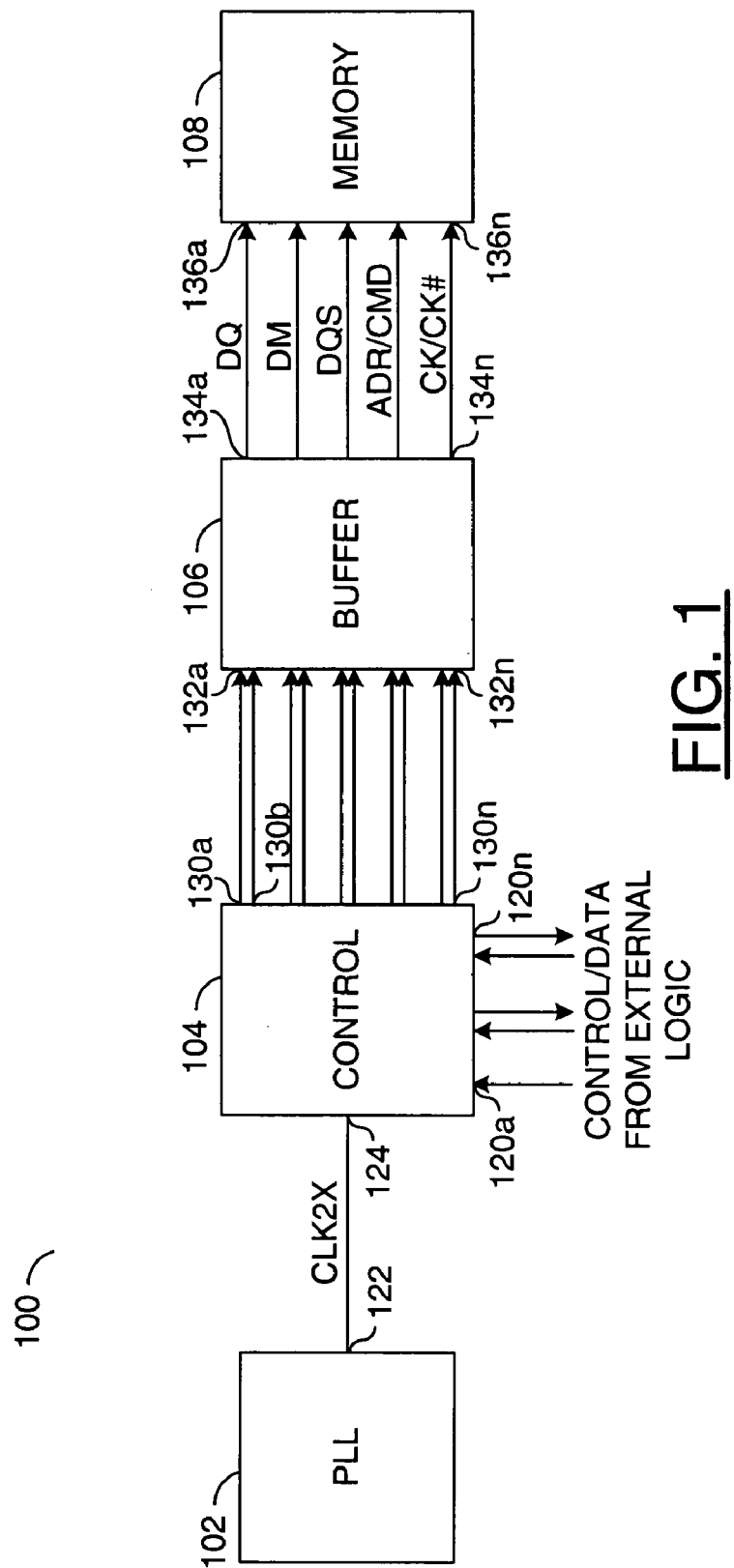
FIG. 1 is a block diagram of the present invention.

Referring to FIG. 1, a block diagram of a circuit 100 is shown in accordance with a preferred embodiment of the present invention. The circuit 100 may be implemented as a memory architecture. The circuit 100 generally comprises a block (or circuit) 102, a block (or circuit) 104, a block (or circuit) 106, and a block (or circuit) 108. The circuit 102 may be implemented as a clock generation circuit. In one example, the circuit 102 may be implemented as a phased-locked loop (PLL). The circuit 104 may be implemented as a control circuit. The circuit 106 may be implemented as a buffer circuit. In one example, the circuit 106 may be implemented as an IO buffer circuit. The circuit 108 may be implemented as a memory. In one example, the memory may be a double data rate (DDR) synchronous dynamic random access memory (SDRAM). However, other memories may be implemented to meet the design criteria of a particular implementation. Additionally, the memory 108 may be implemented to operate using a 1.8 volt core voltage. However, other core voltages may be implemented to meet the design criteria of a particular implementation.

The control circuit 104 may have a number of input/output paths 120a-120n. The input/output paths 120a-120n may present control signals and/or data to and from an external logic. In one example, the external logic may be a customer-specific logic block. The control and data signals may operate at a frequency generally referred to as a single speed (e.g., 1×) or may be referred to as being clocked with a single speed clock. The single speed clock, or single speed, generally refers to the speed that the memory architecture 100 operates with respect to the control and/or data signals presented/received on the input/output paths 120a-120n. The memory architecture 100 may process single speed data and/or control signals, but may operate internally at a frequency twice the speed (e.g., 2×) of the single speed clock (e.g., at a double rate).

The PLL 102 may have an output 122 that presents a clock signal (e.g., CLK2X). The clock signal CLK2X may be presented to an input 124 of the control circuit 104. The clock signal CLK2X generally represents a double-speed clock signal. The control circuit 104 may have a number of outputs 130a-130n (where n is an integer) that may present signals to a number of inputs 132a-132n of the buffer circuit 106. The particular number of outputs 130a-130n may be increased or decreased to meet the design criteria of a particular implementation. The signals presented at the outputs 130a-130n may be data signals, address signals and/or clock signals. For example, the outputs 130a-130f (e.g., the top six outputs) may present data signals and clock signals. The outputs 130g-130h (e.g., the seventh and eighth signals from the top) may present an address signal and a clock signal. The outputs 130i-130n may present clock signals (e.g., the remaining outputs).

The signals presented from the control circuit 104 may be grouped in pairs. For example, a first signal in each group may be a control signal, a data or clock signal, while a second signal in each group may be a clock signal. For example, the output 130a may present a data signal, while the output 130b may present a clock signal. The clock signal presented on the output 130b may be used by the buffer 106 to generate a rising edge to capture and transmit the data signal from the output 134a.

The buffer 106 may be implemented as a registered buffer. For example, the buffer 106 may use an edge of the clock signal received on an input (e.g., 132b) of each pair of inputs 132a-132n to capture the data, clock, address or control signal received on the other input (e.g., 132a) of each pair of inputs. In one example, the buffer 106 may be registered on the rising edge of the corresponding clock signal. However, the buffer 106 may be implemented to be registered on the falling edge of the corresponding clock signal. The buffer 106 may have a number of outputs 134a-134n that present one or more signals (e.g., DQ, DM, DQS, ADR/CMD, CK/CK#) to a number of inputs 136a-136n of the memory 108. In one example, the signals DQ and DM may be implemented as data signals, the signal DQS may be implemented as a data strobe signal, the signal ADR/CMD may be implemented as an address signal and the signal CK/CK# may be implemented as a differential clock signal. However, the particular number of data signals and the particular number of address signals may be varied to meet the design criteria of a particular implementation.

Figure 2:
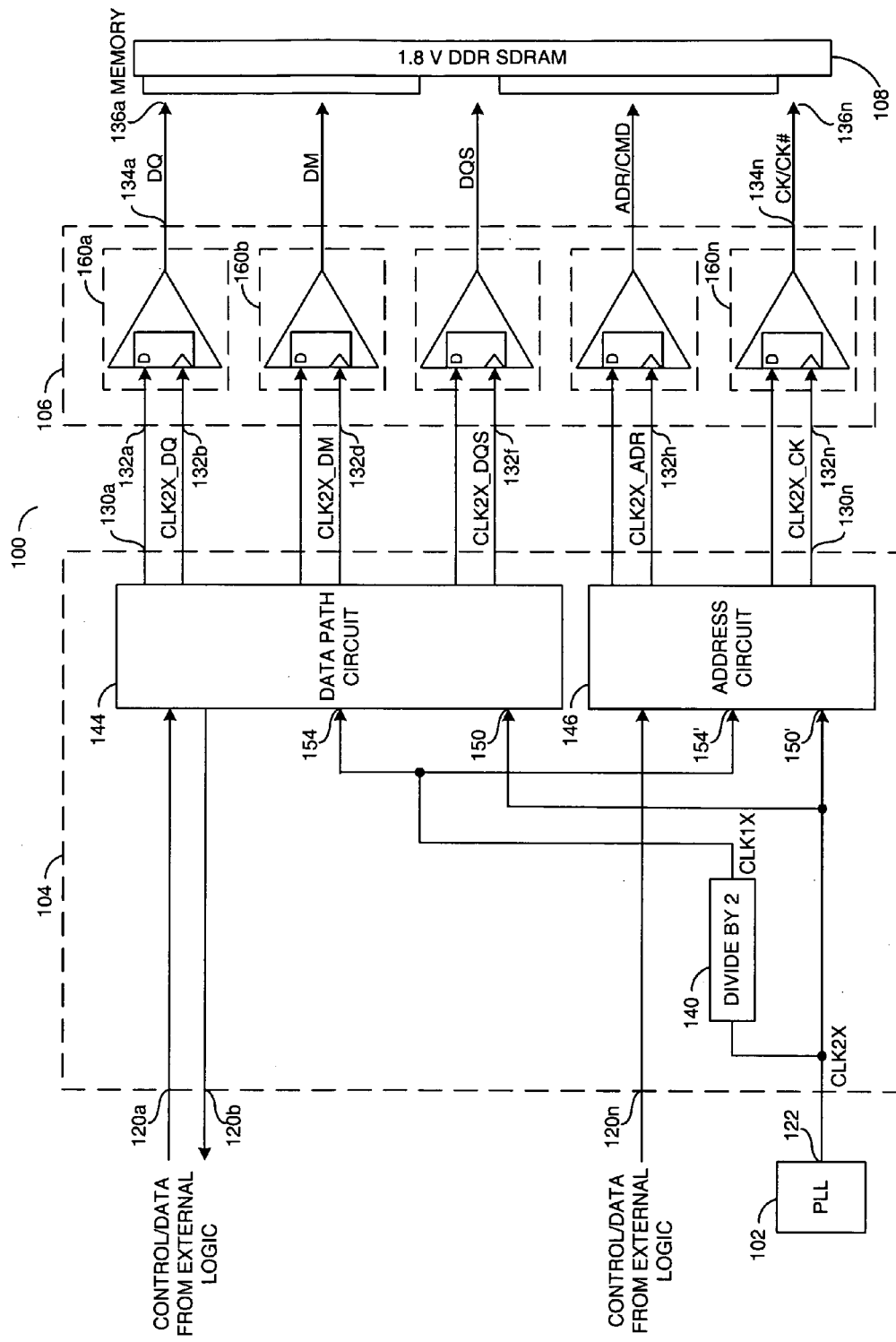
FIG. 2 is a more detailed diagram of the present invention.

Referring to FIG. 2, a more detailed block diagram of the circuit 100 is shown. The control circuit 104 generally comprises a block (or circuit) 140, a block (or circuit) 144 and a block (or circuit) 146. The circuit 140 may be implemented as a divide circuit. In one example, the divide circuit 140 may be implemented as a divide by 2 circuit. The divide by 2 circuit 140 generates a signal (e.g., CLK1X) in response to the clock signal CLK2X. The clock signal CLK1X generally represents the single rate clock signal. The clock signal CLK1X may be used to provide a single rate clock domain that may be used with the incoming single rate data on the input lines 120a-120n. In one example, the signal CLK1X is generally presented to the circuit 144 and the circuit 146. In another example, the circuit 144 and the circuit 146 may generate a single rate clock internally.

The circuit 144 may be implemented as a data path circuit. In one example, the data path circuit 144 may be implemented as a data path hardmacro circuit. The circuit 146 may be implemented as an address circuit. In one example, the address circuit 146 may be implemented as an address hardmacro circuit. The data path circuit 144 may have an input 154 that generally receives the clock signal CLK1X and an input 150 that receives a signal (e.g., CLK2X) from the PLL 102. The address circuit 146 may have an input 154' that generally receives the clock signal CLK1X and an input 150' that generally receives the clock signal CLK2X from the PLL 102. While the circuit 144 and the circuit 146 are shown receiving the clock signal CLK1X, the circuit 144 and the circuit 146 may be implemented without such an input. In such a case, the circuit 144 and the circuit 146 may be implemented with an internal divide circuit configured to generate a single speed clock signal from the clock signal CLK2X.

The buffer circuit 106 generally comprises a plurality of blocks (or circuits) 160a-160n. In one example, each of the circuits 160a-160n may be implemented as a DDR, stub series terminated logic (SSTL) IO buffer. However, the circuits 160a-160n may be implemented as other types of buffers to meet the design criteria of a particular implementation. The data path circuit 144 may present a number of clock signals (e.g., CLK2X_DQ, CLK2X_DM, CLK2X_DQS) for the data to the inputs 132b, 132d and 132f of the circuits 160a-160n. The address circuit 146 may present the clock signals (e.g., CLK2X_ADR, CLK2X_CK) for the addresses to the inputs 132h and 132n of the circuits 160a-160n. The clock signal CLK2X_ADR may be an address clock signal. The clock signal CLK2X_CK may be a master clock signal. The buffer circuits 160a-160n capture the memory address/control and other memory signals from the inputs 132a, 132c, etc. The buffer circuits 160a-160n use the clock signals from the inputs 132b, 132d, etc. to transmit the memory address/control and other memory signals through the outputs 134a-134n at the frequency of the clock signals received from the inputs 132b, 132d, etc. The memory address/control signals presented to the buffer 106 generally operate in the 1× clock domain. The signals DQ, DM, DQS, ADR/CMD and CK/CK# are converted in the address 146 and the data path circuit 144 from the 1× domain to the 2× domain.

The buffer circuit 106 transmits each of the address/control signals in the 2× domain. Each of the clock signals received at the inputs 132b, 132d, etc. are generally derived from the clock signal CLK2X. The clock signal CLK2X generally allows for better control of the on-chip skew between the memory data clock signals CLK2X_DQ, CLK2X_DM and CLK2X_DQS and the memory address/control clock signals CLK2X_ADDR and CLK2X_CK, since all of these signals are transmitted in a single clock domain controlled by the clock signal CLK2X. Although the buffer circuit 106 has been illustrated comprising unidirectional buffers, a person skilled in the field of the invention would recognize that the buffers 160a-160n may be implemented as bi-directional buffers to allow the memory 108 to transmit the signals DQ and DQS to the circuit 104. For example, when the circuits 160a-160n are implemented as bi-directional buffers, the memory 108 may present the signals DQ and DQS to the circuits 160a-160n. The circuits 160a-160n may present the signals DQ and DQS to the data path circuit 144. The data path circuit 144 may present the signals DQ and DQS to the external logic.

Figure 3:
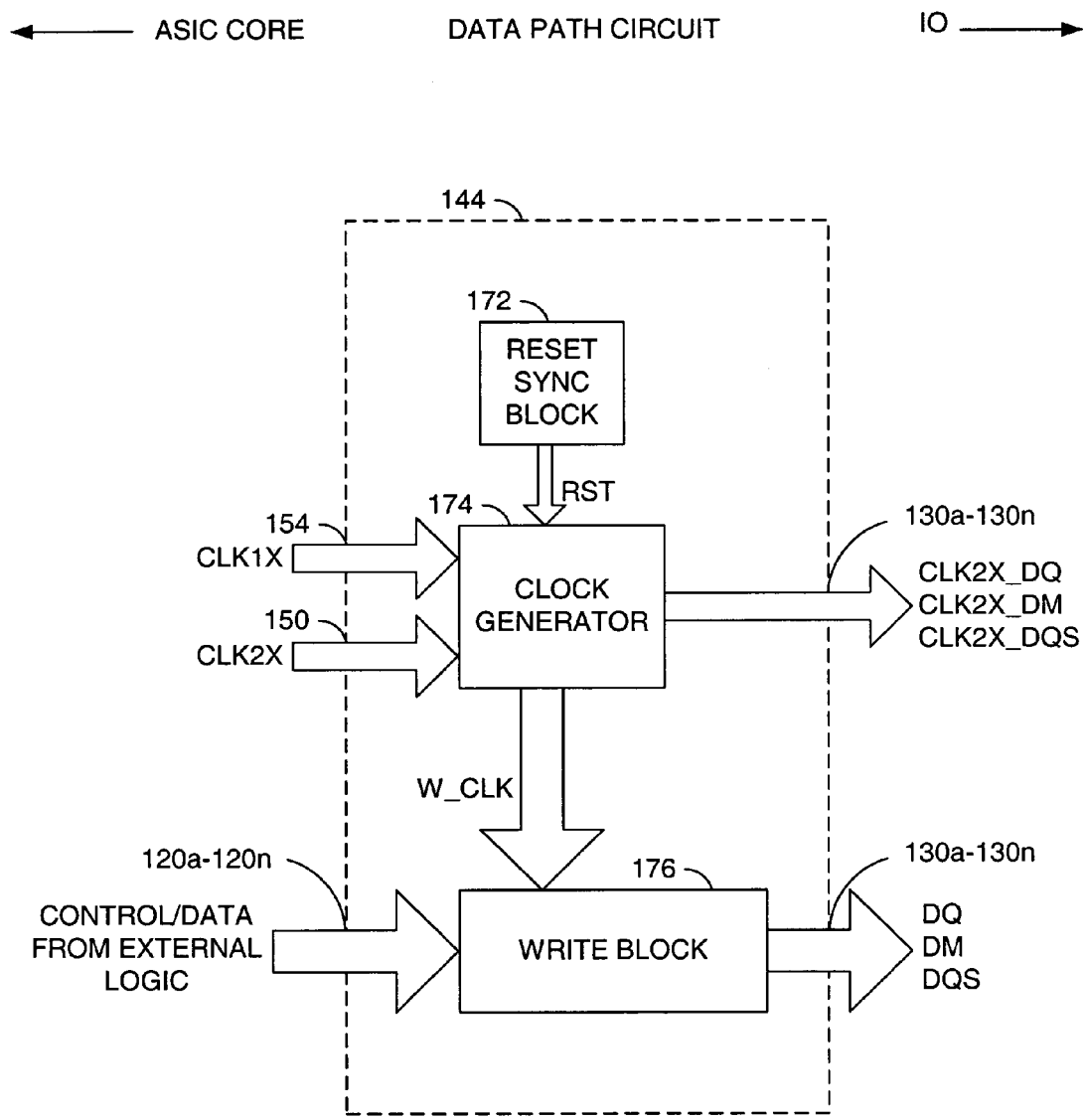
FIG. 3 is a more detailed diagram of the data path circuit.

Referring to FIG. 3, a more detailed block diagram of the circuit 144 is shown. The data path circuit 144 generally comprises a block (or circuit) 172, a block (or circuit) 174, and a block (or circuit) 176. The circuit 172 may be implemented as a reset sync block. The circuit 174 may be implemented as a clock generator. The circuit 176 may be implemented as a write block.

The write block 176 may receive data from an external logic on the inputs 120a-120n. The write block 176 may present the data signals (e.g., DQ, DM and DQS) to the buffer circuit 106 in response to receiving data from the external logic. The clock generator 174 presents a signal (e.g., W_CLK) to the write block 176. The clock generator 174 may generate the signal W_CLK as a double-speed clock signal. The clock generator 174 may generate clock signals (e.g., CLK2X_DQ, CLK2X_DM, CLK2X_DQS) on the outputs 130a-130n at a double clock rate in response to receiving the signal CLK2X on the input 150. The reset sync block 172 may present a signal (e.g., RST) to the clock generator 174.

In one example, the data path circuit 144 may include a read block (not shown). The read block may receive data signals (e.g., DQ and DQS) from the buffer circuit 106. The memory circuit 108 may present the data signals DQ and DQS to the buffer circuit 106. The read block may present the data signal DQ and DQS to the external logic. The clock generator 174 may present the clock signal CLK2X to the read block.

Figure 4:
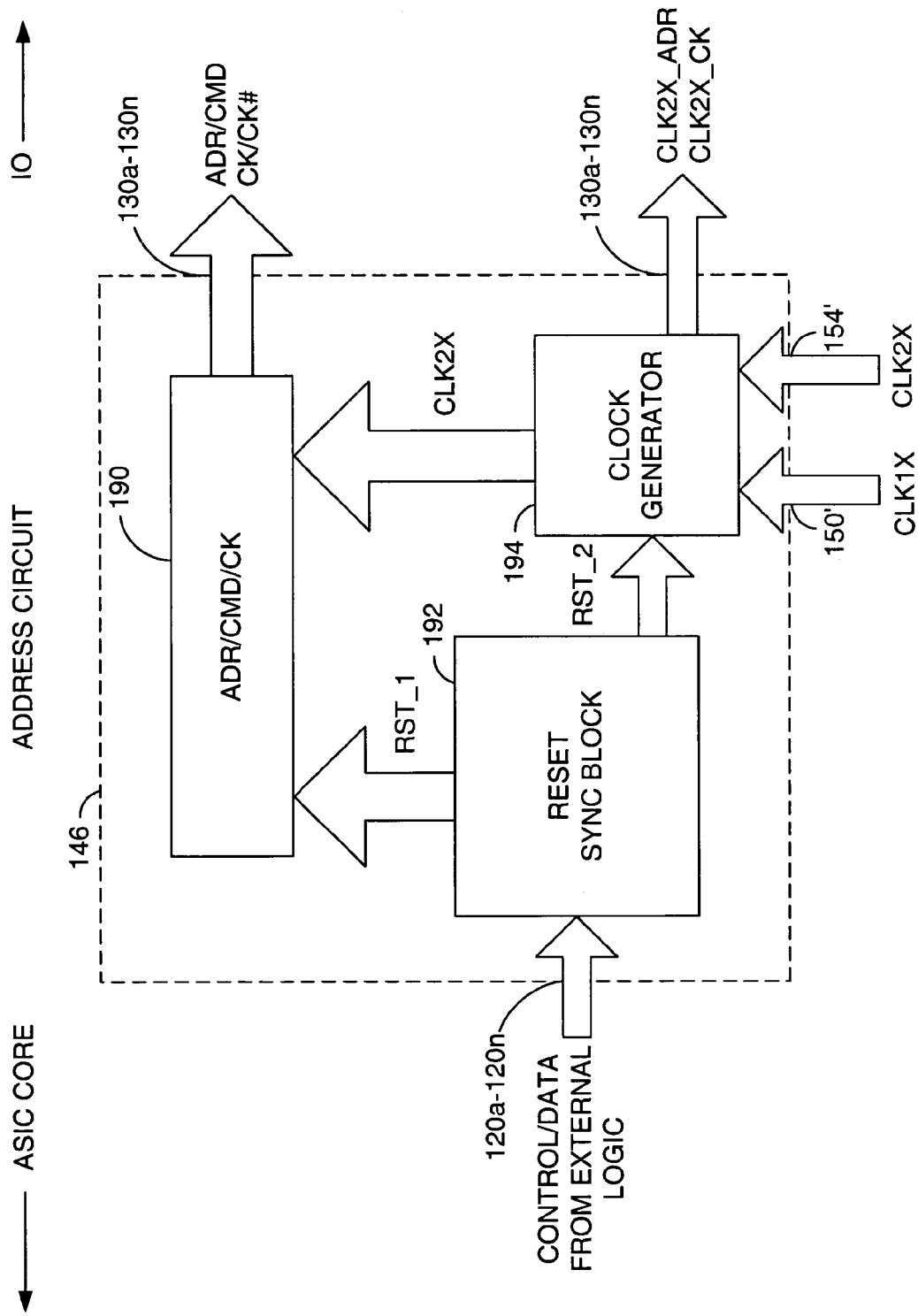
FIG. 4 is a more detailed diagram of the address circuit.

Referring to FIG. 4, a more detailed block diagram of the circuit 146 is shown. The address circuit 146 generally comprises a block (or circuit) 190, a block (or circuit) 192, and a block (or circuit) 194. The circuit 190 may be implemented as an address, command, and clock signals generator. The circuit 192 may be implemented as a reset sync block. The circuit 194 may be implemented as a clock generator.

The reset sync block 192 may present a signal (e.g., RST_1) to the circuit 190. The signal RST_1 may be used to reset the circuit 190. The reset sync block 192 may present a signal (e.g., RST_2) to the clock generator 194. The signal RST_2 may be used to reset the clock generator 194. The clock generator 194 may present the clock signals (e.g., CLK2X_ADR, CLK2X_CK) on the outputs 130a-130n. The clock generator 194 may receive the clock signal CLK2X on the input 150'. The clock generator 194 may receive the clock signal CLK1X on the input 154. The clock generator 194 may present the clock signal CLK2X to the circuit 190. The circuit 190 may present signals ADR/CMD and CK/CK# on the outputs 130a-130n.

Figure 5:
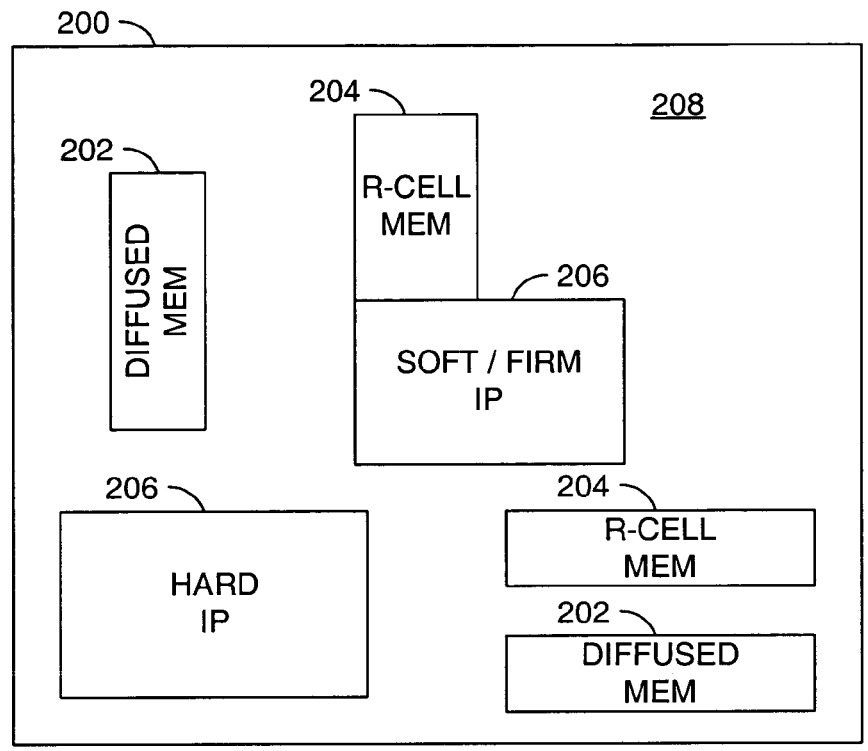
FIG. 5 is a block diagram of a programmable platform device.

Referring to FIG. 5, a block diagram of a programmable platform device (or die, or slice) 200 is shown. The slice 200 may be implemented, in one example, to include the circuit 100. The slice 200 may be implemented, in one example, as a partially manufactured semiconductor device in which all of the silicon layers have been fabricated and customization may be performed via one or more metal layers. In one example, the slice 200 may comprise one or more regions of diffused memory 202, one or more regions of R-cell memory 204, one or more IP (intellectual property) blocks 206 and a diffused region 208. In another example, multiple diffused regions 208 may be implemented. The regions 202, 204, 206, and 208 may be distributed around the slice 200. The diffused memory 202 and hard (diffused) IP 206 regions are generally fixed. Other blocks (e.g., PLLs, IOs, etc.) may be implemented in a slice to meet the design criteria of a particular application.

In one example, a number of slices 200 may be fabricated having different varieties and/or numbers of IP blocks, diffused memories, etc. By fabricating a variety of slices with a variety of IP blocks and diffused memories, a wide variety of applications may be supported. For example, a particular slice may be selected for customization because the particular IP blocks implemented are suitable for a customized application.

The IP blocks 206 may comprise, for example, a hard IP, a soft IP and/or a firm IP. The hard IP may be diffused at optimal locations within a slice using cell-based elements for maximum performance and density (e.g., embedded processors, transceivers, etc.). The soft IP may be incorporated into a slice as a function block. The soft IP may be implemented in similarly to other blocks in a design (e.g., with specific timing criteria to ensure functionality). The firm IP generally allows fully routed and characterized high-performance blocks to be implemented in a slice design.

In one example, the IP blocks 206 may be implemented similarly to an ASIC design. In general, the IP blocks 206 may be configured to provide a number of functions on the slice 200. For example, the IP blocks 206 may comprise phase locked loops (PLLs), one or more instances of processors, one or more input/output PHY level macros, etc. The soft and firm IP blocks may be implemented in the diffused region(s) 208.

The regions 208 may be customized, in one example, as logic and/or memory. For example, the regions 208 may be implemented as a sea of gates array. In one example, the regions 208 may be implemented as an R-cell transistor fabric comprising a number of R-cells. As used herein, R-cells generally refer to an area of silicon designed (or diffused) to contain one or more transistors that have not yet been personalized (or configured) with metal layers. Wire layers may be added to the R-cells to make particular transistors, logic gates, soft and firm IP blocks and/or storage elements. For example, the R-cell memories 204 may be non-diffused memory built out of the programmable R-cells in the R-cell transistor fabric 208. The present invention may be configured to determine the placement of (i) the R-cell memories 204 and (ii) the soft and/or firm IP blocks 206.

An R-cell generally comprises one or more diffusions for forming the parts of N and/or P type transistors and the contact points where wires may be attached in subsequent manufacturing steps (e.g., to power, ground, inputs and outputs). In general, the R-cells may be, in one example, building blocks for logic and/or storage elements (e.g., the R-cell memories 204). R-cells may be diffused in a regular pattern throughout a slice. For example, one way of designing a chip that performs logic and storage functions may be to lay down numerous R-cells row after row, column after column. A large area of the chip may be devoted to nothing but R-cells. The R-cells may be personalized (or configured) in subsequent production steps (e.g., by depositing metal layers) to provide particular logic functions. The logic functions may be further wired together (e.g., a gate array design).

Figure 6:
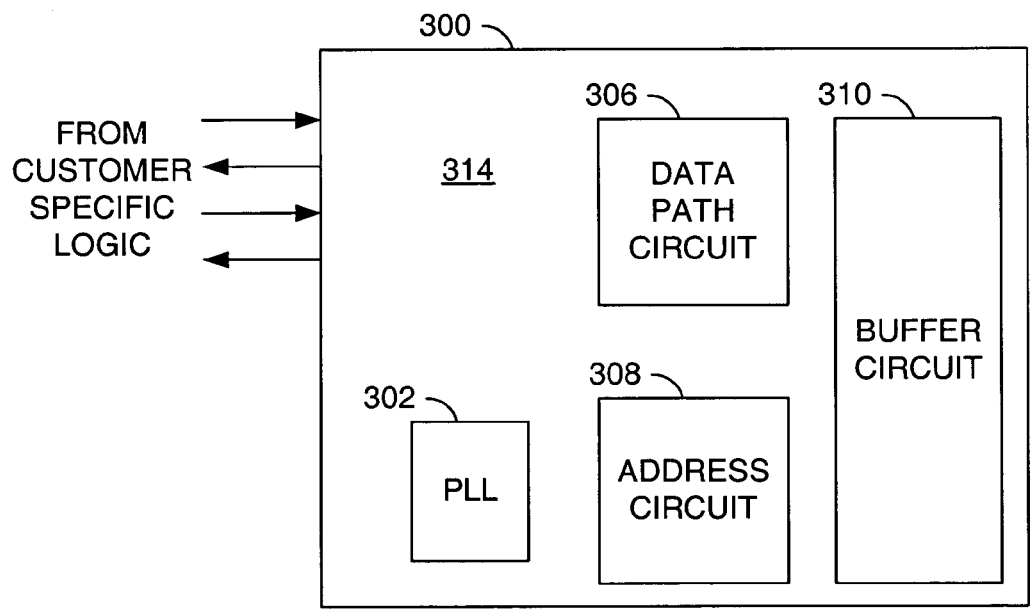
FIG. 6 is a block diagram of a slice implementing the preferred embodiment of the present invention.

Referring to FIG. 6, a block diagram of a slice 300 implementing an embodiment of the present invention is shown. The slice 300 generally comprises a block (or circuit) 302, a block (or circuit) 306, a block (or circuit) 308, a block (or circuit) 310, and a block (or circuit) 314). In one example, the circuit 302 may be implemented as a PLL. The circuit 306 may be implemented as a data path circuit. The circuit 308 may be implemented as an address circuit. The circuit 310 may be implemented as a buffer circuit. The slice 300 further comprises additional diffused regions 314. The diffused region(s) 314 may be placed in one or more particular regions within the slice 300. The diffused region 314 may include a number of R-cells. R-cells may be personalized or configured to form the circuits within the slice 300 when wire layers are added to the R-cells.

The R-cells may be configured to form an IP block. The IP block may be implemented as the data path circuit 306. The R-cells may be configured as gates, flip-flops and/or memory. The R-cells may also be configured to produce the PLL 302, the address circuit 308, and/or the buffer circuit 310.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
a control circuit configured to present a plurality of pairs of signals in response to (i) one or more input data signals operating at a first clock speed, (ii) one or more input address signals operating at said first clock speed, and (iii) an input clock signal operating at a second clock speed, wherein (a) a first one or more of said plurality of pairs of signals comprise internal data signals, (b) a second one or more of said plurality of pairs of signals comprise internal address signals, (c) a second signal in each of said plurality of pairs of signals comprises a clock signal operating at said second clock speed, and (d) said internal data signals and said internal address signals operate at said second clock speed;
a buffer circuit configured to generate a buffered signal in response to each of said plurality of pairs of signals, wherein each of said buffered signals operates at said second clock speed; and
a memory circuit configured to read and write data at said second clock speed in response to said buffered signals.

2. The apparatus according to claim 1, wherein said input clock signal is generated with a phase-locked loop circuit.

3. The apparatus according to claim 1, wherein said control circuit presents said plurality of pairs of signals in further response to one or more control input signals.

4. The apparatus according to claim 1, wherein said memory circuit comprises a double data rate (DDR), synchronous dynamic random access memory (SDRAM).

5. The apparatus according to claim 1, wherein said control circuit further comprises:
a divide circuit configured to (i) divide said input clock signal into an internal clock signal operating at said first clock speed and (ii) present said internal clock signal to said control circuit.

6. The apparatus according to claim 1, wherein said plurality of pair of signals further comprises:
a first signal in each of said pairs operating at said second clock speed.

7. The apparatus according to claim 1, wherein said control circuit further comprises:
an address circuit configured to convert said one or more input address signals operating at said first clock speed into said one or more internal address signals operating at said second clock speed.

8. The apparatus according to claim 1, wherein said control circuit further comprises:
a data path circuit configured to convert said one or more input data signals operating at said first clock speed into said one or more internal data signals operating at said second clock speed.

9. The apparatus according to claim 8, wherein said data path circuit further comprises:
a read block configured to transmit said one or more input data signals from said memory circuit to an external logic.

10. The apparatus according to claim 1, wherein said buffer circuit comprises a plurality of DDR SSTL IO buffers.

11. The apparatus according to claim 1, wherein said buffered signal comprises one or more data signals and one or more address signals.

12. An apparatus comprising:
means for presenting a plurality of pairs of signals in response to (i) one or more input data signals operating at a first clock speed, (ii) one or more input address signals operating at said first clock speed, and (iii) an input clock signal operating at a second clock speed, wherein (a) a first one or more of said plurality of pairs of signals comprise internal data signals, (b) a second one or more of said plurality of pairs of signals comprise internal address signals, (c) a second signal in each of said plurality of pairs of signals comprises a clock signal operating at said second clock speed, and (d) said internal data signals and said internal address signals operate at said second clock speed;
means for generating a buffered signal in response to each of said plurality of pairs of signals, wherein each of said buffered signals operates at said second clock speed; and
a memory configured to read and write data at said second clock speed in response to said buffered signals.

13. A method for reading and writing data comprising the steps of:
(A) presenting a plurality of pairs of signals in response to (i) one or more input data signals operating at a first clock speed, (ii) one or more input address signals operating at said first clock speed, and (iii) an input clock signal operating at a second clock speed, wherein (a) a first one or more of said plurality of pairs of signals comprise internal data signals, (b) a second one or more of said plurality of pairs of signals comprise internal address signals, (c) a second signal in each of said plurality of pairs of signals comprises a clock signal operating at said second clock speed, and (d) said internal data signals and said internal address signals operate at said second clock speed;
(B) generating a buffered signal in response to each of said plurality of pairs of signals, wherein each of said buffered signals operates at said second clock speed; and
(C) reading and writing data at said second clock speed in response to said buffered signals.

14. The method according to claim 13, wherein step (A) further comprises the step of:
generating said input clock signal with a phase-locked loop circuit.

15. The method according to claim 13, wherein said plurality of pairs of signals is further presented in response to one or more control input signals.

16. The method according to claim 13, wherein step (A) further comprises:
converting said one or more input address signals operating at said first clock speed into said one or more internal address signals operating at said second clock speed with an address circuit.

17. The method according to claim 13, wherein step (A) further comprises:
converting said one or more input data signals operating at said first clock speed into said one or more internal data signals operating at said second clock speed with a data path circuit.

18. The method according to claim 13, wherein said method further comprises the step of:
dividing said input clock signal into an internal clock signal operating at said first clock speed.

19. The method according to claim 13, wherein step (B) further comprises:
generating one or more data signals and one or more address signals at said second clock speed in response to each of said plurality of pairs of signals.

20. The method according to claim 13, wherein step (B) further comprises:
generating a clock signal at said second clock speed in response to each of said plurality of pairs of signals.

* * * * *